UNITED STATES PATENT OFFICE.

LOUIS KLUEBER, OF EAST NEW YORK, N. Y.

COMPOSITION OF MATTER FOR THE PRODUCTION OF SLATE.

SPECIFICATION forming part of Letters Patent No. 314,688, dated March 31, 1885.

Application filed July 18, 1884. (No specimens.)

*To all whom it may concern:*

Be it known that I, LOUIS KLUEBER, of East New York, Kings county, State of New York, a citizen of the United States, have invented a new and useful Composition of Matter to be Used for the Production of Artificial Slate, of which the following is a specification.

My composition consists of the following ingredients, combined in the proportions as stated, viz: white marble-dust about three (3) parts, white lead about one (1) part, and white dammar varnish about one-sixth ($\frac{1}{6}$) part of the whole. The white marble-dust is ground and pulverized as fine as possible, as well as the English china white lead, in about the proportions above stated, three to one, and mixed into a paste with one-sixth, about, of the whole mass, of white dammar varnish dissolved in turpentine. These ingredients are well mixed to a mass capable of being used as a paint and applied with a brush. The material—such as tin, paper, pasteboard, linen, or any other suitable material to form the body of the artificial slate—is then painted on one or both sides with this composition several times, until the desired thickness is obtained on the material, allowing each coating to dry before the next coat of paint is applied. After the desired thickness of paint or composition has thus been applied to the material the same is allowed to dry thoroughly for several days in a dry open room without the application of artificial heat, and is then polished by the use of fine sand-paper and pumice-stone to a smoothness capable of being written upon by a lead-pencil, and can thus be used similar to a slate, the marks of the lead pencil, and even ink-marks, being at any time easily removed by the application of a little moisture.

If desired, coloring-matter may be added to the above to give any desired color to the composition.

What I claim as my invention, and desire to secure by Letters Patent, is—

The herein-described composition of matter to be used as a paint applied to a suitable material, consisting of finely-powdered white marble-dust and English china white lead and white dammar varnish, in the proportions specified.

LOUIS KLUEBER.

Witnesses:
HENRY E. ROEDER,
J. B. NONES.